United States Patent [19]

Pham van Cang

[11] Patent Number: 4,544,952

[45] Date of Patent: Oct. 1, 1985

[54] CORRECTION CONTROL DEVICE AND A SYSTEM FOR AUTOMATIC ESTABLISHMENT OF CORRECTION DATA FOR A TELEVISION CAMERA

[75] Inventor: Luc Pham van Cang, Paris, France

[73] Assignee: Thomson-CSF, Paris, France

[21] Appl. No.: 487,017

[22] Filed: Apr. 21, 1983

[30] Foreign Application Priority Data

Apr. 23, 1982 [FR] France .................. 82 07065

[51] Int. Cl.[4] .............................. H04N 5/30
[52] U.S. Cl. .................... 358/210; 358/163; 358/80; 358/51; 358/28; 358/29
[58] Field of Search ............. 358/209, 225, 227, 228, 358/210, 163, 80, 51, 213, 28, 29

[56] References Cited

U.S. PATENT DOCUMENTS

| | | |
|---|---|---|
| 4,123,782 | 10/1978 | Kitahara et al. |
| 4,285,004 | 8/1981 | Morrison ..................... 358/10 |
| 4,320,414 | 3/1982 | Miyaji et al. ................ 358/51 |
| 4,326,219 | 4/1982 | Griesshaber ................ 358/163 |

Primary Examiner—Gene Z. Rubinson
Assistant Examiner—Stephen Brinich
Attorney, Agent, or Firm—Oblon, Fisher, Spivak, McClelland & Maier

[57] ABSTRACT

The correction control device for a television camera connected to camera channel equipment comprises a mass memory unit containing the camera correction data, a correction memory, a digital computer for transferring the correction data contained in the mass memory unit into the correction memory, as well as correction circuits which are responsive to the correction data contained in the correction memory in order to produce action on the adjustment circuits of the camera and/or of the channel equipment unit.

10 Claims, 8 Drawing Figures

CORRECTION CONTROL DEVICE AND A SYSTEM FOR AUTOMATIC ESTABLISHMENT OF CORRECTION DATA FOR A TELEVISION CAMERA

This invention relates to a correction control device and to a system for automatic establishment of correction data for a television camera.

In the present state of the technique, it is a known practice to provide television camera channel equipment with advanced adjustment, control and correction means consisting of microprocessors coupled with means for storing data in memory and carrying out the different control and monitoring programs. These different means are grouped together within a housing which is usually separate from the camera. The housing is usually provided with a preview monitor controlled by an operator. During normal operation, the monitor control desk enables the operator to adjust the output level of the signals delivered by the camera, to adjust the black and white levels, to vary the camera lens aperture, to observe the quality of transmitted images to control the voltage and current parameters of beams and target which govern the operation of the camera tube.

However, evaluation of defects to be corrected and performance of correction remain one-step actions carried out by an automatic control unit provided with the programs and means which were developed at the moment of putting of the camera into service and which cannot readily be varied when the conditions of utilization become different from those for which the camera had initially been adjusted. This situation imposes even more exacting requirements when, for example, a camera has to be replaced on account of faulty operation since the channels of the old camera may not necessarily be equipped with correcting means which are conducive to good operation of the replacement camera. Under these conditions, it often proves necessary to replace the entire assembly of camera and equipment. A further disadvantage lies in the complexity and consequently the cost price of the channel equipment itself which may include a large number of devices in order to satisfy the operating conditions of a television studio, for example. Such devices may consist of monitors, waveform oscilloscopes, vectorscopes, video voltmeters as well as video signal generators of various types.

The aim of the invention is to overcome these disadvantages by means of a television camera control device consisting of a homogeneous and coherent assembly of means which permit evaluation and characterization of defects of the video signal delivered by the television camera, which permit modification and correction of the defective signal, and which also make it possible to communicate the defects and correction parameters to the operator and to his environment.

The invention accordingly relates to a correction control device for a television camera connected to a camera channel equipment unit. The device essentially comprises a mass memory unit containing the camera correction data, a correction memory, a digital computer for transferring the correction data contained in the mass memory unit into the correction memory automatically, as well as correction circuits which are responsive to the correction data contained in the correction memory in order to produce action on the adjustment circuits of the camera and/or of the channel equipment unit.

The invention is also concerned with a system for automatic establishment of television camera correction data and for practical application of the correcting device in accordance with the invention. The correcting device is coupled on the one hand to a camera test signal generator and on the other hand to a device for acquisition and sampling of the signals generated by the camera with a view to processing the correction data in order to control the camera adjustment circuits when the amplitudes of the video signals received by the acquisition device are different from those emitted by the test signal generator.

Other features of the present invention will be more apparent upon consideration of the following description and accompanying drawings, wherein.

Figure 1:
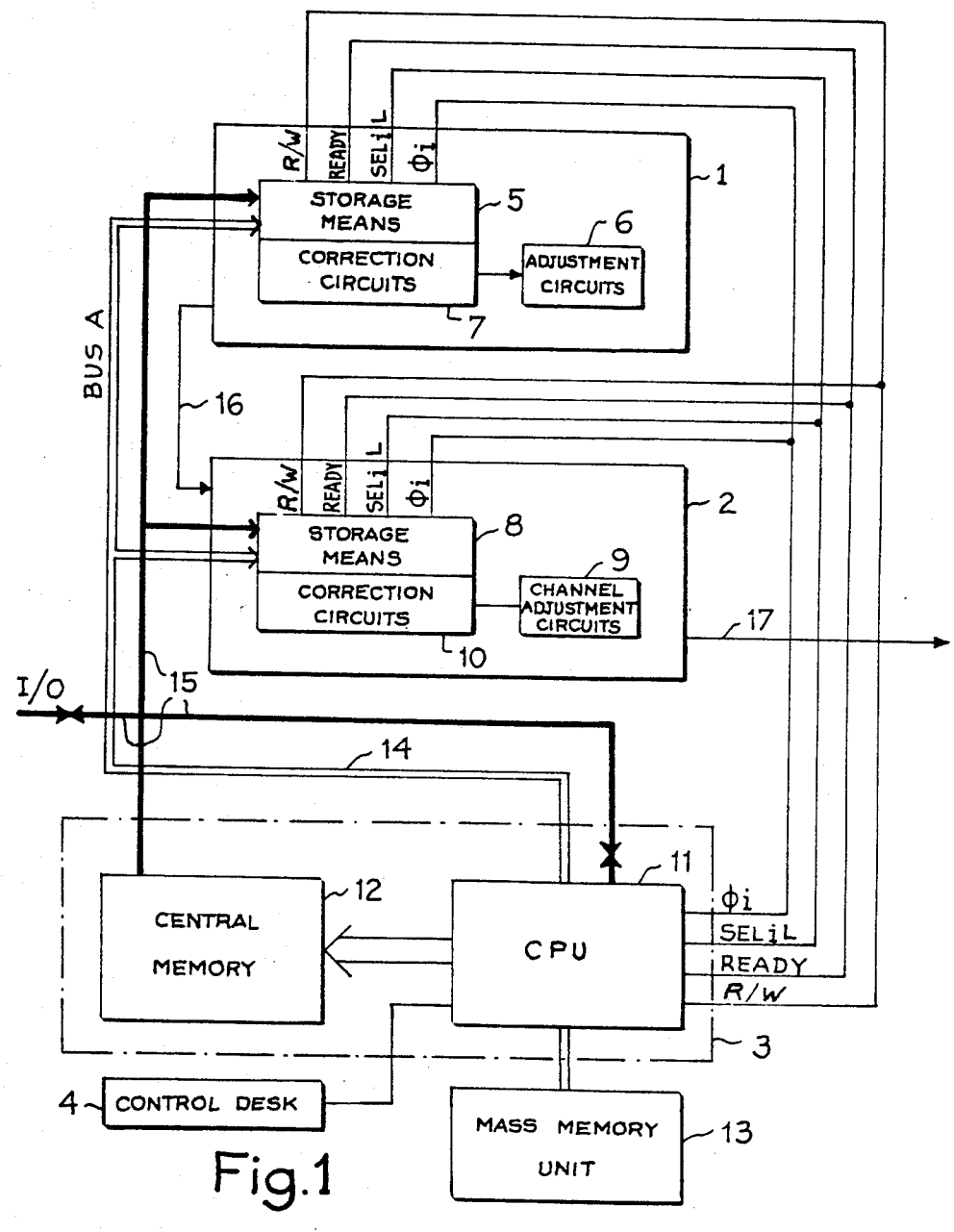
FIG. 1 is a general representation of the correcting device in accordance with the invention.

The device illustrated in FIG. 1 comprises a camera 1, a camera channel equipment unit 2, a digital computer 3 and a control desk 4. The camera 1 comprises means 5 for storing correction data, said storage means being connected to circuits 6 for adjusting the camera by means of a correction circuit 7 composed of a number of digital-to-analog converters. The camera channel equipment unit 2 also comprises correction data storage means 8 connected to channel adjustment circuits 9 via correction circuits 10 composed of digital-to-analog converters. The computer 3 has a microcomputer structure and is constituted in known manner by a central processing unit CPU 11 connected to a central memory 12. The central processing unit 11 is also connected on the one hand to a mass memory unit 13 consisting for example of a disk or diskette memory and, on the other hand, to the control desk 4 consisting of a keyboard, for example. For further details on microcomputer structures, reference may be made to the book entitled "Micro-processeur et Micro-ordinateur" (Microprocessor and Microcomputer) by R. Lyon Caen and J. M. Crozet published by Masson, Paris, 1977 or to the book entitled "Minicomputer systems" by K. Weitzman published by Prentice Hall Inc., New York, 1974. The central processing unit 11 of the computer 3 is connected to the addressing inputs of the storage means 5 and 8 via the bus address line, BUSA 14 and via the control and synchronization lines R/W, READY, Φ$_i$ and SEL$_i$L, the functions of which are explained in the following description of the invention. The data outputs of the central memory 12 are connected to the data inputs of the storage means 5 and 8 and to the input-output gates of the central processing unit 11 via the data line 15. The video signal generated by the camera 1 is transmitted to the camera channel equipment unit 2 by means of a transmission line 16. The video signal generated by the channel of camera 2 is transmitted to television equipment units (which are external to the device and not shown in the drawings) via the connecting line 17.

Figure 2:
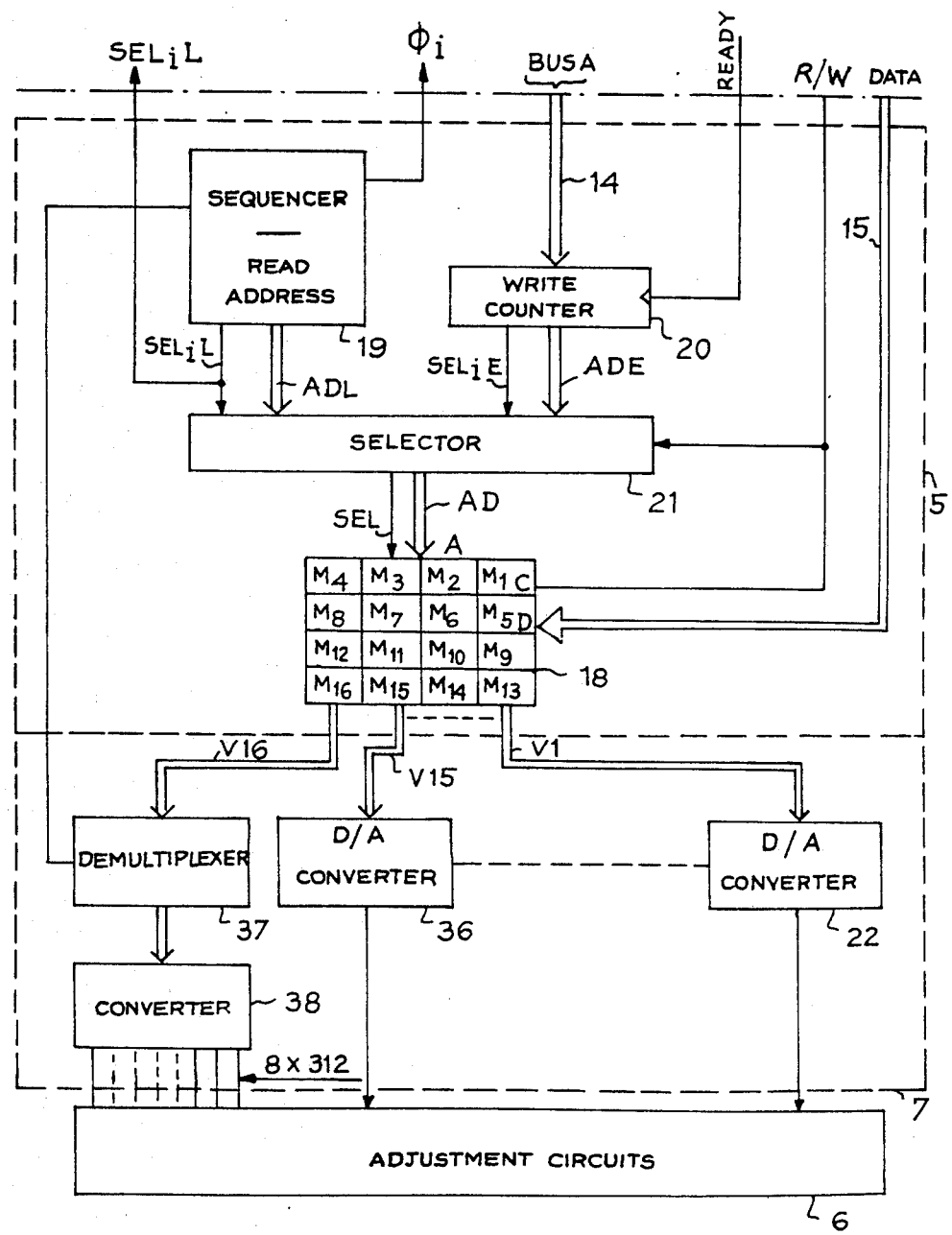
FIG. 2 is a block diagram of the means for addressing the correction memory as well as the connections between said means and the correction circuits and the camera adjustment circuits.

The structure of the correction data storage means for the camera and/or the camera channel equipment are shown within the dashed-line rectangle 5 of FIG. 2. Said storage means comprise a random-access correction memory (RAM) 18, a read address sequencer 19 and a write counter 20. In the particular embodiment of the invention which is given by way of example, the correction memory 18 is constituted by a memory plane composed of sixteen elementary random-access memories (RAMs) $M_1$ to $M_{16}$ each having a storage capacity of 1 k/octets. A memory plane of this type could be constructed by means of circuits of the type marketed by the Intel Company under the trade reference No.SN 6148. The memory 18 comprises an address input A, a control input C, a write data input D and read data outputs $V_1$ to $V_{16}$. The inputs A, C and D are common to each of the corresponding inputs of the sixteen elementary RAMs. On the other hand, the outputs $V_1$ and $V_{16}$ are connected respectively to the corresponding outputs of the RAMs $M_1$ to $M_{16}$ in order to transmit the corresponding correction data to the corresponding adjustment circuits 6 of the camera via the correction circuit 7.

The address inputs of the elementary RAMs of the correction memory 18 are connected on the one hand to the address outputs of the sequencer 19 via the line ADL and on the other hand to the outputs of the write counter 20 via the line ADE through a selector 21 which transmits one of the two selected addresses over the address line AD to the input A of the correction memory 18. The selector 21 is activated by the central processing unit 11 of the computer 3 which transmits a read or write control signal over a read/write line R/W which is connected to the control input of the selector 21. When the R/W line is in a first state, the selector 21 connects the output of the address sequencer 19 to the address inputs of the memory 18. When the R/W line is in a second state, the selector 21 connects the output of the write counter to the address inputs of the memory 18. The R/W line is also connected to the read or write control input C of the correction memory 18 in order to ensure that, when the R/W line is in the first state, the memory 18 is put in the read mode and the memory contents are read at the addresses indicated by the address outputs of the read address sequencer 19 and that, when the R/W line is in the second state, the memory 18 is put in the write mode and the memory contents can be modified at the addresses indicated by the contents of the write counter 20.

The correction memory 18 further comprises data inputs D connected to data lines 15. When the memory 18 is put in the write mode by the state of the read/write line R/W, the data placed on the line 15 by the central memory of the computer 3 are written into the correction memory 18 at the address indicated by the contents of the write counter 20. The address contained in the write counter 20 indicates both the location of the elementary memory $M_i$ of the memory plane and the address of the location within the elementary memory in which the data item is to be written.

In the case of a memory structure comprising sixteen elementary memories of 1 k/octets, the address of the word to be written is coded by means of a 14-bit word: the four high-order bits provide the address of the selected elementary memory and the other ten bits indicate the address of the octet to be written into the selected memory. In this type of structure, the write counter 20 is composed of fourteen flip-flops. When the memory 18 is put in the read mode by the read/write line R/W, the data to be read are addressed by the sequencer 19, the address output of which indicates the elementary memory and the address of the word of an octet to be read within the selected elementary memory. The selected word appears at one of the outputs $V_1$ to $V_{16}$ of the memory 18.

The structure of the correction circuit 7 is also shown in FIG. 2. The correction circuit 7 is constituted by a plurality of digital-to-analog converters 22 to 36, the inputs of which are connected respectively to the outputs $V_1$ to $V_{15}$ of the memory 18 and the outputs of which deliver analog signals to the adjustment circuit 6 of the camera. The correction circuit 7 further comprises a demultiplexer 37 controlled by the sequencer 19 which directs the octets read from the memory 18 and placed at the output $V_{16}$ to the input of a converter 38 consisting of a bank of storage registers each connected via their outputs to a digital-to-analog converter, the number of which depends on the number of corrections to be made. The register bank 38 is primarily employed for performing static corrections on the camera signals which are not of a nature to require frequent modification as is the case, for example, with the correction of convergence defects in which it is sought to correct defective linearity in the directions of the vertical axis (Y-axis) and horizontal axis (X-axis) of the image. In this case, the correction device utilizes a two-dimensional table containing the correction data which are a function of the position P(X,Y) of the scanned point. Since the distortion between the position of the point being scanned and the real position of the point in which it should be located within the image space can be described in each of these directions by a very small value, it is in fact only necessary to have a small number of correction values which can also be determined in the system of coordinates X and Y of the image in order to ensure that the convergence function is correctly performed on the television signal. In fact, it is sufficient to fill the image space with a squared grid consisting of a matrix of eight columns and 312 lines and to assign the corresponding correction value to each elementary square of the matrix. This corresponds to the $8 \times 312$ outputs of the digital-to-analog converters of the converter 38 of FIG. 2. The output analog signals of the converter 38 are applied as before to the inputs of the camera adjustment circuits.

The camera adjustment circuits mostly consist of variable-gain channel amplifiers which produce action on the control grids or the deflection plates of the camera or else they can consist of devices for remote control of the camera lens aperture. The structure of these circuits forms part of the state of the technique and therefore does not need to be illustrated in order to gain a clear understanding of the invention.

Figure 3:
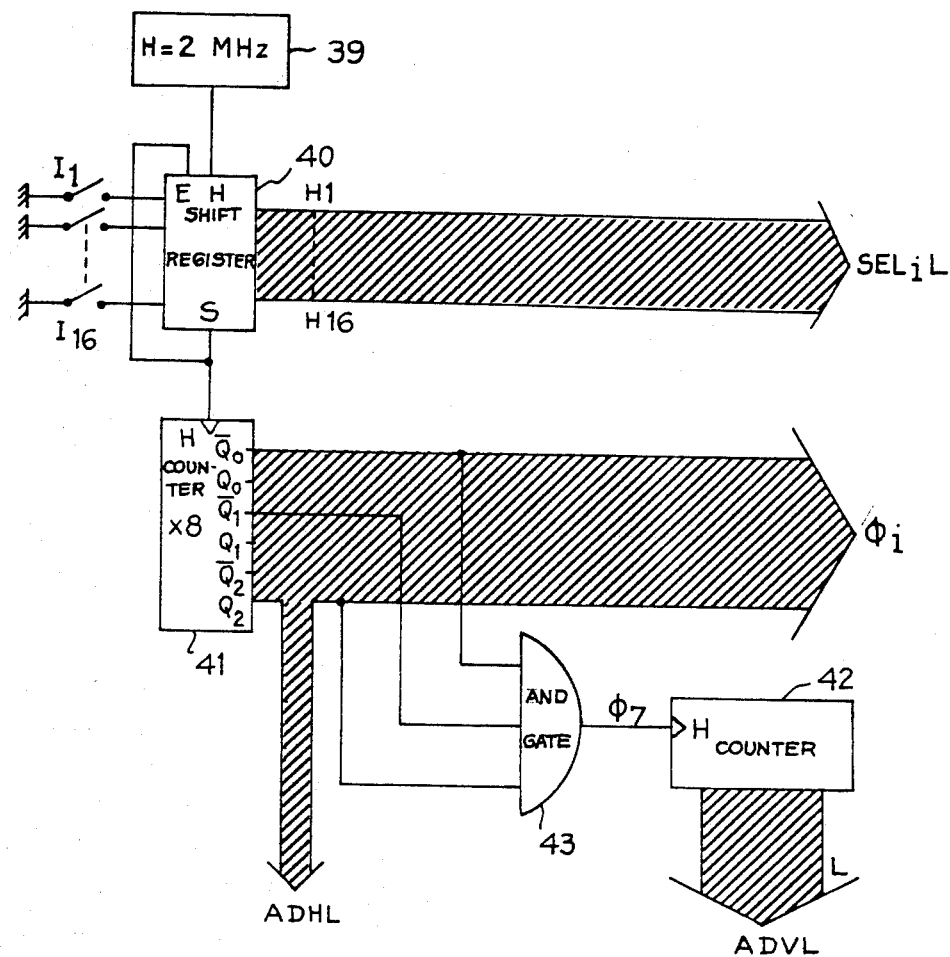
FIG. 3 illustrates the circuits of the reading address sequencer of FIG. 2.

The structure of the sequencer 19 is illustrated in FIG. 3. The sequencer 19 comprises a timing control clock 39 for delivering signals having a frequency of 2 MHz on the one hand to camera target scanning circuits (not shown in the figure) and on the other hand to the clock input H of a shift register 40, the output of which is connected in a feedback loop to its input and is composed of sixteen flip-flops which are mounted in series and which deliver the elementary clock signals $H_1$ to $H_{16}$ at their respective outputs. The shift register 40 is initially loaded with the binary word having a weight $$\sum_{0}^{n=15} 2^n = 1$$

represented by the state of the switches $I_1$ to $I_{16}$ connected respectively at one end to the parallel inputs of the shift register 40 and at the other end to the general supply ground of the device. The state of the switches is defined so as to ensure that the state of the switch $I_1$ is open and that the state of the other switches $I_2$ to $I_{16}$ is closed. At the time of initialization, for example when applying voltage to the device, the signal $H_1$ has the logical value 1, for example, and the signals $H_2$ to $H_{16}$ have the value 0. At the following clock instants, the state 1 of the first flip-flop is transmitted successively to the following flip-flops and retransmitted at the end of a cycle to the input of the first flip-flop when it appears at the output of the shift register 40. The shift register 40 consequently makes it possible to obtain signals $H_1$ to $H_{16}$ which successively assume the logical state 1 during a period of 0.5 microsecond in a cycle of eight microseconds. The signals $H_1$ to $H_{16}$ are transmitted over the line $SEL_iL$ to the computer 3 and to the corresponding input of the selector 21 in order to address one of the sixteen elementary memories of the storage means 18. The series output of the register 40 is connected to the input H of a counter 41 in order to ensure incrementation of the horizontal addresses of the elementary memories of the correction memory 18. The counter 41 comprises three flip-flops in order to form a counting capacity of 8. The outputs $Q_0$ to $Q_2$ of the counter 41 are connected on the one hand to the computer 3 by means of the line $\Phi_i$ and on the other hand to the corresponding input of the selector 21 in order to address the vertical lines of addresses of the elementary memories of the correction memory 18. The sequencer 19 also comprises a counter 42 which ensures incrementation of the addresses of the horizontal lines of the elementary memories of the correction memory 18. In the exemplified embodiment of the invention, the counter 42 has a capacity of 312 and is composed of nine flip-flops, the outputs of which are connected to the corresponding inputs of the selector 21 in order to address the corresponding horizontal lines of the correction memory 18. The clock input H of the counter 42 is connected to the counter 41 via the three-input AND-gate 43, a first input of which is connected to the output $Q_2$ of the counter 41, a second input of which is connected to the output $\overline{Q_1}$ of the counter 41 and a third input of which is connected to the output $\overline{Q_0}$ of the counter 41.

Figure 4:
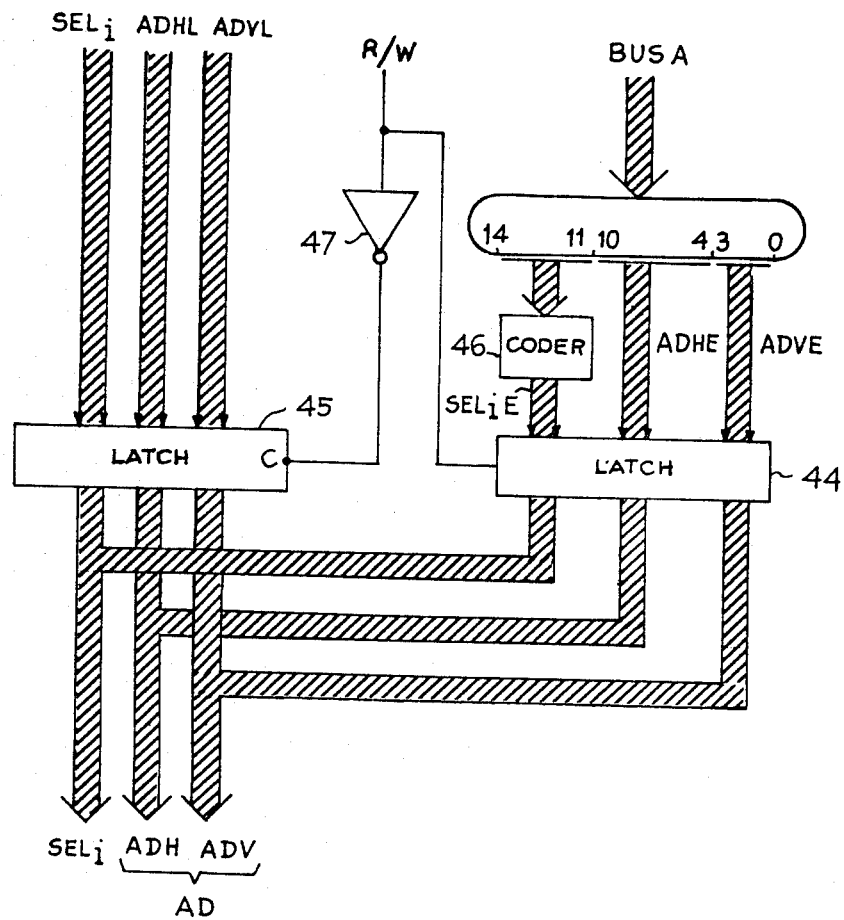
FIG. 4 illustrates the circuits constituting the read-/write address selector of FIG. 2.

The selector 21 is illustrated in FIG. 4 and comprises two latches circuits 44 and 45 each constituted by amplifiers of the three-state type which transmit the logic states 0 and 1 at their outputs with a low output impedance when they are driven at their control inputs C by a signal having a first state, the output impedance of said amplifiers being of very high value when they are driven at their control input C by a signal which is in a second state. The inputs of the latch 44 are connected to the bus address line BUSA of the computer directly via the conductors ADHE and ADVE and indirectly to the remaining conductors of the bus address line via the coder 46. The conductors ADVE and ADHE transmit respectively the first four low-order bits $A_0$ to $A_3$ of the address of the octet to be written and the following seven bits $A_4$ to $A_{10}$ to the respective inputs of the storage elements of the memory 18 via the latch 44. The remaining conductors transmit the address bits $A_{11}$ to $A_{14}$ for selection of the elementary memories to the input of the coder 46. The coder 46 comprises sixteen outputs which are connected by sixteen conductors to the respective selection inputs of the elementary memories via the latch 44. The control input C of said latch 44 is connected to the read/write conductor R/W in order to transfer, when it is driven by the computer 3, the address bits which are present on the conductors ADVE, ADHE and the selection signals $SEL_iE$ delivered by the coder 46 to the corresponding conductors of the address lines ADH, ADV, $SEL_i$ which connect the output of the selector to the address inputs of the correction memory 18.

The inputs of the latch 45 are connected respectively to the respective outputs ADHL, ADVL of the counters 41 and 42 and to the outputs $H_1$ to $H_7$ of the shift register 40 via the line $SEL_iL$ of the sequencer 19. The control input of the latch 45 is connected to the read/write conductor R/W via the inverting amplifier 47 in order to transfer, when it is driven by the computer 3, the address bits which are present on the conductors ADVL, ADHL and the selection signals $SEL_iL$ delivered by the shift register 40 to the corresponding conductors of the address lines ADV, ADH and $SEL_i$ which connect the output of the selector to the address inputs of the storage means 18.

The operation of the device which has just been described will now be explained in detail with reference to the timing diagram of FIG. 5 and with reference to the flow charts of FIGS. 6 and 7.

Figure 5:
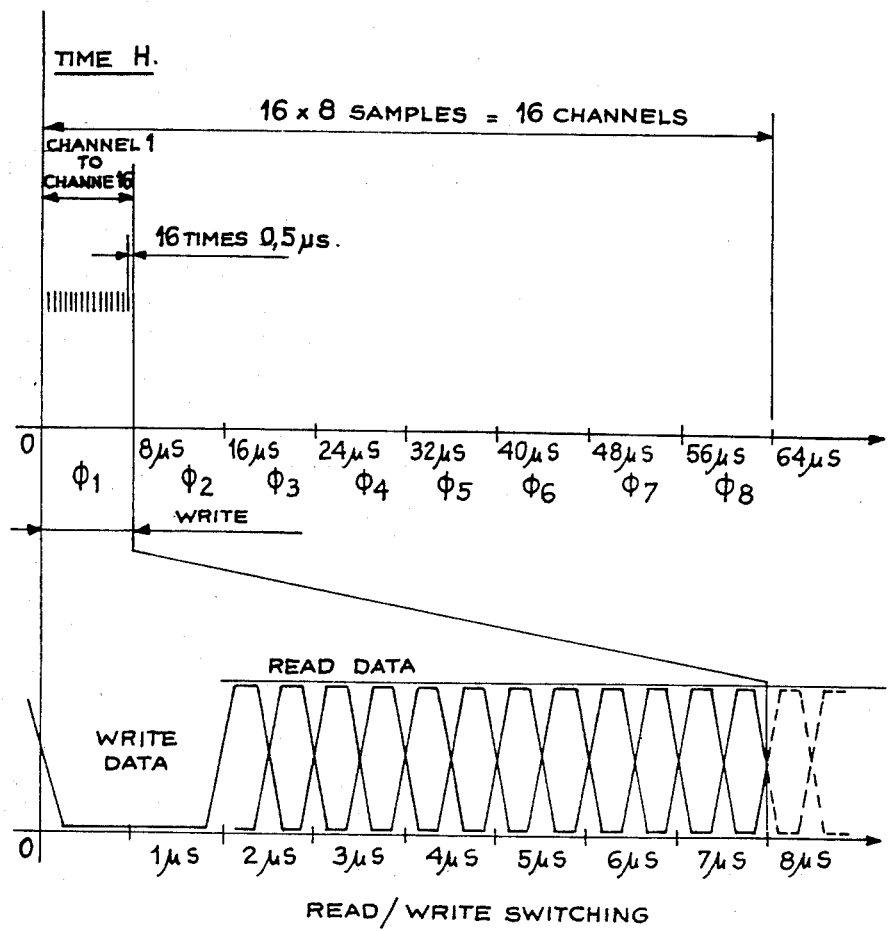
FIG. 5 is a timing diagram representing the instants of reading and writing of the correction data in the correction memory of the device shown in FIG. 2.

The timing diagram of FIG. 5 represents the instants during which the correction data are written into or read from the correction memory 18. In this diagram, the horizontal axis of time values corresponds to the standard period of 64 microseconds of scanning of one horizontal line of a television image. The scanning period of 64 microseconds is divided into eight intervals each having a duration of eight microseconds, and each interval is subdivided into sixteen elementary intervals of 0.5 microsecond. The elementary time intervals of 0.5 microsecond are obtained from signals $H_1$ to $H_{16}$ delivered by the shift register 40 and from time intervals of eight microseconds delivered by the counter 41 which is time-controlled from the register 40 and the eight states $\Phi_1$ to $\Phi_8$ of which have respective time-durations of eight microseconds. The signals $H_1$ to $H_{16}$ permit time-selection in the read mode via the line $SEL_iL$ of the sixteen elementary memories of the correction memory 18. In order to prevent any disturbance of camera operation, the first time interval $\Phi_1$ of eight microseconds is reserved for reading or writing operations in the elementary memories and the following time intervals $\Phi_2$ to $\Phi_8$ are reserved for reading operations in the correction memory 18. The states of the signals $H_1$ to $H_{16}$ and $\Phi_1$ to $\Phi_8$ are transmitted to the computer by the corresponding connecting conductors and cause program interruptions within said computer in order to automatically initiate input and output procedures for correction data to be transferred to the correction memory 18.

These input-output operations are consequently performed in synchronism with the signals $H_1$ to $H_{16}$ and $\Phi_1$ to $\Phi_8$ delivered by the sequencer 19. An input-output procedure can be carried out either for reading or writing of data in the correction memory 18. Reading or writing operations are controlled by the computer 3 by placing the read/write line R/W in a first state (logic state 1) when the computer performs a writing operation and in a second state (logic state 0) when the computer performs a reading operation.

Figure 6:
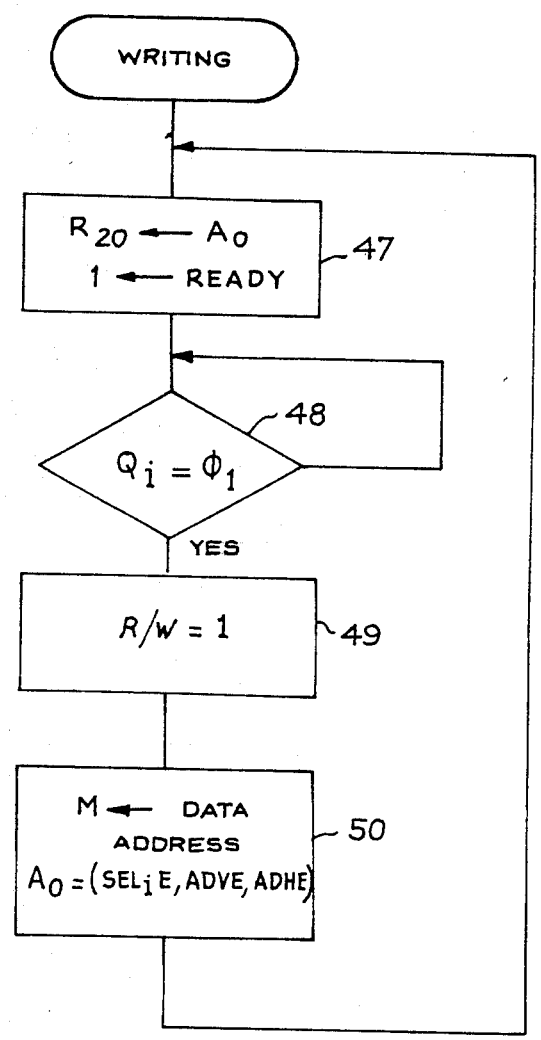
FIG. 6 is a flow chart showing the stages of operation of the device in the write mode for recording correction data in the correction memory of FIG. 2.

When a writing operation is performed by the computer, the operations represented by the flow chart of FIG. 6 are carried out. In stage 47, the selector 21 is controlled by the logic state 1 which is present on the read/write line R/W in order to connect the input of the correction memory 18 to the output of the write counter 20. Loading of the write counter 20 is performed by the READY signal transmitted by the corresponding conductor which connects the control input of the write counter 20 to the computer 3. Since the writing operation can be performed only during the first state $\Phi_1$ of the counter 41, the computer positions the read/write line R/W in the logic state 1 when it has checked at stage 48 that the counter 41 is in state $\Phi_1$. When this condition is satisfied, stage 50 is performed and the correction datum is placed by the computer on the data line 15 in order to be written in the memory element of the correction memory 18 at the address contained in the write counter 20.

When the writing operation is completed, the input-output program of the computer returns to the start of execution of stage 47 in order to write another datum in the correction memory 18 or reverts to execution of the program which was interrupted at the time of appearance of the state $\Phi_1$ of the counter 41, or carries out a reading operation in the correction memory 18.

Figure 7:
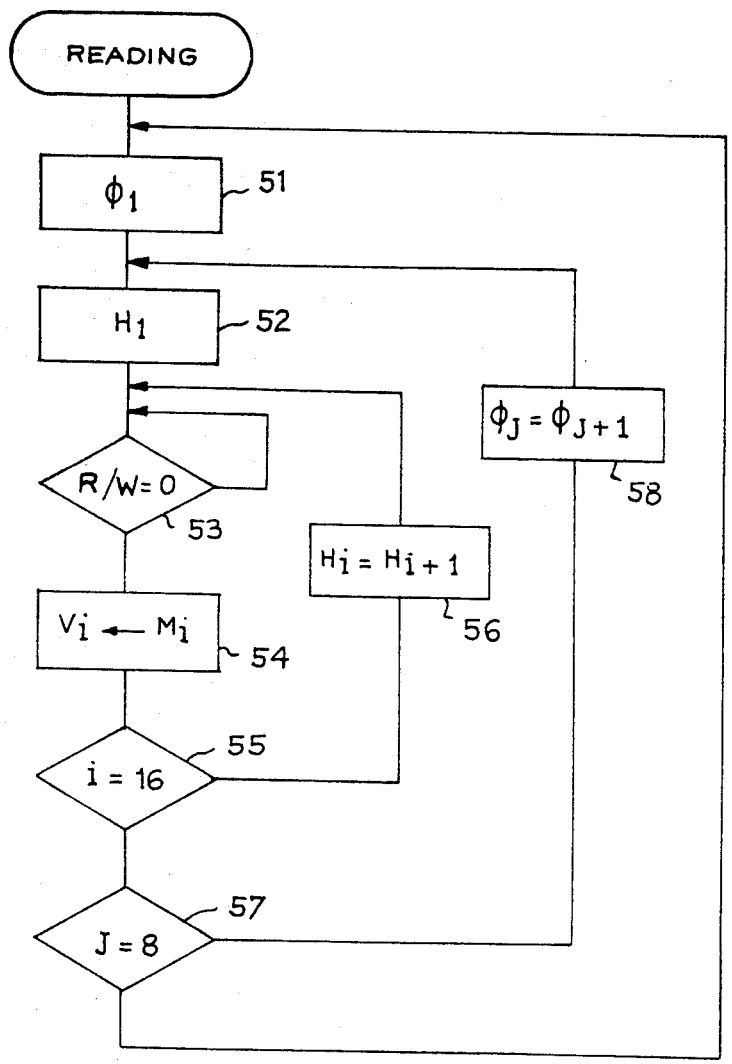
FIG. 7 is a flow chart showing the performance of operations which involve reading of data contained in the correction memory of the device illustrated in FIG. 2.

One example of application of an input-output procedure for reading information contained in the memory 18 is shown in FIG. 7. In accordance with the flow chart of FIG. 7, the array of sixteen elementary memories of the correction memory 18 can be read during each of the time intervals $\Phi_1$ to $\Phi_8$. In the diagram of FIG. 7, the first reading operation is shown at stage 51 which represents a reading operation during the time interval $\Phi_1$ and, within said time interval $\Phi_1$, reading of the first storage element takes place during the time interval $H_1$ shown at stage 52. At stage 53, the computer positions the state of the read/write line R/W in the logic state 0. Then at stage 54, the contents of the first elementary memory located at the address indicated by the counter 41 and the counter 42 of the sequencer 19 are placed on the line $V_1$ in order to be converted by the digital-to-analog converter 22 to a direct-current voltage which is directly applied to the input of the corresponding adjustment circuit. At the following instant $H_2$ defined by the stage 56, the computer carries out an operation which consists in reading the storage element $M_2$ of the correction memory 18 by means of a further performance of stages 53 and 54. In this manner, the storage elements $M_1$ to $M_{16}$ are read in succession and their contents are applied respectively to the inputs of the digital-to-analog converters 22 to 36 and to the input of the multiplexer 37. At stage 55, when the sixteen storage elements have all been read, the computer performs a reading operation during phase $\Phi_2$ represented by the state of the counter 41 by again carrying out all the stages 52 to 56. When at stage 57, the eight phases of the counter 41 have all been completed, the computer returns to stage 51 in order to perform a further reading of the storage means 18 during the following television-image scanning line or resumes the program which was interrupted during performance of the reading input-output procedure, or resumes execution of a writing operation during the following phase $\Phi_1$.

The different operations of reading and writing of the correction memory 18 can be carried out either at the time of startup of the camera or during operation of the camera or even when the camera is not actually taking any pictures which are intended to be retransmitted on the television image distribution network.

At the time of startup of the camera, the computer searches in the mass memory unit 13 for the correction data which correspond to the camera head, to the channel and to the utilization program required. This program may correspond to operation of the camera in a field location during the summer in full sunlight, and so on.

In this mode of operation, it is assumed that the data have been processed beforehand and held in storage on a recording medium such as a floppy disk or diskette. An initialization program transfers the data contained in the mass memory unit to the correction memories associated with the camera head and with the channels. When the initialization period comes to an end, the computer performs the programs which are necessary for normal operation of the camera by carrying out a program of control of the camera output signals. The computer activates the control desk of the camera and carries out the camera operation control programs as well as the orders introduced into the keyboard of the control desk 4 and relating to modifications of adjustment, of measurements or switching of signals in the monitor.

During normal operation of the camera, the computer assumes two distinct functions which may vary in detail according to the programming of the computer. A first function consists in transmitting the orders of the control desk 4 to the correction memories 18 which are associated with the equipment units. The second function consists in carrying out the programs requested by the operator via the control desk 4 and relating to correction of channels, control of the assembly and measurements of the video signals transmitted by the camera. These programs can also be realized in a cycle of continuous monitoring of the parameters of the correction device.

When the camera is not in operation, the computer may nevertheless continue to manage and automate the adjustments and periodic maintenance of the camera. In order to carry out this function, it will be necessary in this instance to incorporate peripheral units with the computer at the input-output gates of the central processing unit in order to generate optical or electronic measurement signals and thus to initiate automated control and adjustment procedures.

Figure 8:
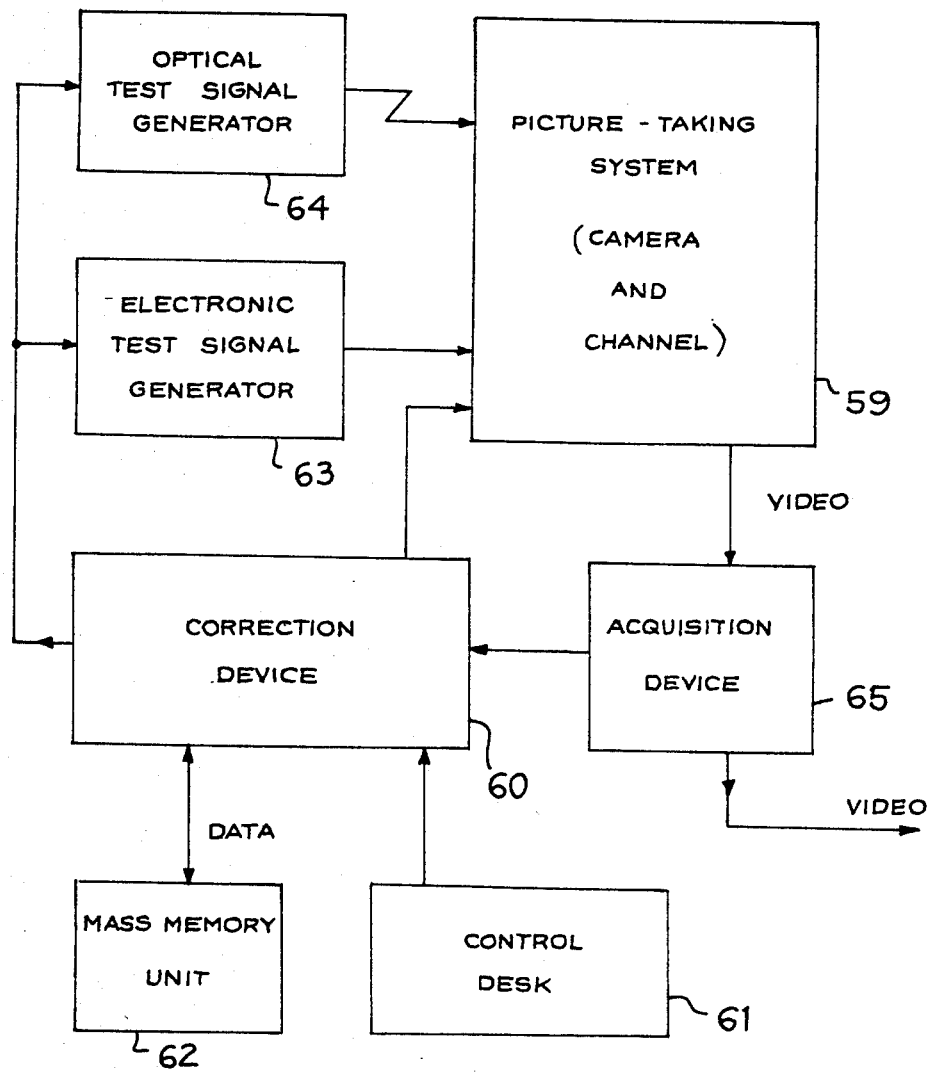
FIG. 8 is a graphic representation of a system for automatic establishment of the correction data which makes use of the correcting device in accordance with the invention.

A system for automatic establishment of correction data is illustrated in FIG. 8. This system comprises a picture-taking device composed of a camera and a channel equipment unit 59, a device 60 for correcting the camera parameters corresponding to the correction device described earlier, a control desk 61 corresponding to the desk 4 described earlier, a mass memory unit 62 composed of a diskette corresponding to the memory 13 described earlier, an electronic test signal generator 63, an optical test signal generator 64, and a device for acquisition of the television signals obtained at the output of the camera and of the channel equipment unit 65. The electronic test signal generator 63 is controlled by the computer of the correction device 60 and delivers test signals to the picture-taking system 59.

In order to realize the system of FIG. 8, generators of the type which deliver the majority of signals required for ordinary testing of television equipment may be used to perform the function of the electronic test signal generator 63. One example of construction of generators of this type is described in French patent application No. 82 004 752. The device for acquisition of the video signal 65 transmitted by the picture-taking system 59 can also be constituted in known manner by a device having the function of converting the video signal to a digital signal which can be directly utilized for the computer 3 of the correction device 60. One example of construction of these devices may be found in the description of French patent application No. 82 004 753.

The operation of the system for automatic establishment of the correction data takes place as follows. The optical test signal generator 64 is placed in front of the lens of the camera and this latter takes a picture of the optical pattern which equips the optical signal generator 64, then converts said picture to video signals which are applied to the input of the acquisition device 65. The acquisition device 65 converts the digital signals and transmits these latter to the input of the correction device 60. An image of the optical pattern composed of the same number N of digital samples is also contained in the storage means associated with the data-processing unit of the correction device and the value of these samples is compared with the corresponding samples of the series of samples transmitted by the acquisition device 65. In the case of each sample transmitted by the acquisition device 65, the data-processing unit thus determines the deviation or difference between said sample and the corresponding sample contained in the storage means of the computer. This difference corresponds to the correction which must be made in the circuit for adjusting the deflection circuits of the camera in order to obtain a correct amplitude of the sample obtained by the device 65. The difference aforesaid is stored in the corresponding storage element of the correction memory 18 of the correction device 60.

In an alternative mode of utilization, a white pattern transmitted by the optical test signal generator 64 can be employed. The position of said pattern will be readily recognizable by the device for acquisition of the video signals delivered by the camera. The computer of the correction device 60 determines the position P(X,Y) of the pattern and deduces from this latter the deviation E(XY) obtained with respect to the real point transmitted by the optical test signal generator. Said deviation is recorded in an elementary memory of the correction memory 18. When this operation is completed, the computer displaces the position of the pattern within the optical signal generator to another point in order to carry out further storage of the deviation observed between the real position of the pattern and its position as detected by the acquisition device 65.

A method of adjustment which is identical with the preceding can also be performed by means of the electronic test signal generator 63. Under the control of the computer of the correction device 60, the electronic test signal generator 63 transmits calibrated test signals to the input of the circuits of the camera or of the channel equipment which restitute these signals to the acquisition device 65. The correction device 60 then examines the response of the video signals obtained and transmits correction signals to the correction memory 18 in order to adjust the gain or the parameters of the transfer functions of the corresponding circuits of the camera or of the channel equipment.

In accordance with another alternative mode of utilization, a manual procedure will consist in placing a geometry and convergence test card in front of the camera and in entering by means of the control desk of the computer 61 a table of values corresponding to the distortions observed by the color monitor for controlling the channel equipment. These correction values will then be transmitted as before by the computer of the device 60 to the memories 18 for correcting the correction data.

Although the principles of the present invention have been described in the foregoing with reference to particular examples of construction, it will be readily apparent that the description has been given solely by way of example and does not limit the scope of the invention.

What is claimed is:

1. A correction control device for a television camera connected to a camera channel equipment unit, wherein said device comprises a mass memory unit containing the camera connection data, a correction memory, a digital computer for transferring the correction data contained in the mass memory unit into the correction memory automatically as well as correction circuits which are responsive to the correction data contained in the correction memory in order to produce action on the adjustment circuits of said camera and/or of said channel equipment unit, wherein the correction memory is a random-access memory addressed by addressing means controlled by the computer and acting in synchronism with the camera target scan and wherein writing of data in the correction memory is carried out by the computer only at the beginning of the camera line scan.

2. A device according to claim 1, wherein the addressing means of the correction memory are constituted by a read address sequencer, a write counter and an address selector for switching the address delivered by the address sequencer or the address contained in the write counter to the address input of the correction memory in order to read or write the correction data in locations of the correction memory.

3. A device according to claim 2, wherein the correction memory is constituted by a plurality of elementary correction memories.

4. A device according to claim 3, wherein the data outputs of each elementary memory are each connected to a correction circuit.

5. A device according to claim 4, wherein each correction circuit comprises a digital-to-analog converter, the inputs of said converter being connected to the outputs of an elementary memory and the output of said converter being connected to the input of an adjustment circuit of the camera.

6. A device according to claim 5, wherein the digital computer consists of a microcomputer.

7. A device according to claim 6, wherein the mass memory unit is a disk memory.

8. A system for automatic establishment of television camera correction data, wherein said system comprises a correction device according to claim 6, said device being coupled on the one hand to a camera test signal generator and on the other hand to a device for acquisition and sampling of the signals generated by the camera with a view to processing correction data in order to control the camera adjustment circuits when the amplitudes of the video signals received by said aquisition device are different from the signals emitted by said test signal generator.

9. A system according to claim 8, wherein the test signal generator is an optical television pattern generator.

10. A system according to claim 9, wherein the test signal generator is an electronic test signal generator.

* * * * *